United States Patent Office 3,618,415
Patented Nov. 9, 1971

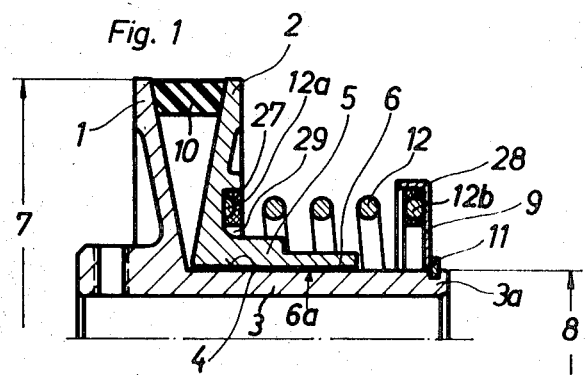

3,618,415
ADJUSTABLE PULLEY
Robert Ruprecht, Raidwangen, Kreis Nurtingen, and Heinrich Grimm, Aichelberg, Kreis Esslingen (Neckar), Germany, assignors to Ernst Heinkel Aktiengesellschaft, Stuttgart-Zuffenhausen, Germany
Filed Nov. 17, 1969, Ser. No. 877,397
Claims priority, application Germany, Nov. 15, 1968, P 18 09 065.8
Int. Cl. F16h 55/52
U.S. Cl. 74—230.17                                13 Claims

ABSTRACT OF THE DISCLOSURE

A stationary flange is fixed on a shaft which has an outer cylindrical surface and a reciprocable flange is mounted on the shaft for axial movement away from the stationary flange against a biassing force. The reciprocable flange has an inner peripheral surface which spacedly surrounds the outer cylindrical surface of the shaft and a liner of a self-lubricating slidable plastic material is confined between and in contact with both of the surfaces.

BACKGROUND OF THE INVENTION

The present invention relates to an adjustable pulley which incorporates a stationary and a reciprocable flange mounted on a shaft with the reciprocable flange adjustably axially movable relative to the stationary flange.

The flanges of such a pulley can either be manually or automatically adjusted and in the latter instance the distance between the fixed and the spring-biassed reciprocable flange is automatically adjusted in conformity with the torque of the pulley.

Hitherto known pulleys of this type necessitate the use of a great many discrete assembly components. For fixation, for example, of the reciprocable flange on the extended hub socket of the fixed flange, roller bearing elements are used which are mounted in hollow recesses at the axially opposite ends of the hub of the fixed flange and which are sealed off by special sealing members disposed in further recesses. Further provided in the assembly are special dogs which serve to transmit the torque of the fixed flange to the reciprocable flange.

Consequently, as regards their construction and maintenance, such adjustable pulleys are extremely uneconomical and complicated.

SUMMARY OF THE INVENTION

Object of the present invention is to provide an adjustable pulley which suitably overcomes the above disadvantages and incorporates but a few assembly components, and is economical and simple in construction.

Such an adjustable pulley according to the present invention comprises a stationary flange fixed on a shaft having an outer cylindrical surface and a reciprocable flange which is mounted on the shaft for axial movement away from the stationary flange against a biassing force. The reciprocable flange has an inner peripheral surface which spacedly surrounds the outer cylindrical surface of the shaft and a liner of a self-lubricating slidable material having a low coefficient of friction is confined between and in contact with both of the surfaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows in longitudinally cross-sectional view the upper half of an adjustable pulley according to the present invention and which is automatically adjustable by means of a pressure spring;

FIG. 2 shows in longitudinal cross-sectional view the lower half of an exteriorly adjustable pulley;

FIG. 3 is a longitudinal cross-sectional view of the three main components constituting the adjustable pulley according to the present invention; and FIG. 4 is a cross-sectional view taken along the line IV—IV of FIG. 3.

DESCRIPTION OF THE PREFERRED EMBODIMENTS

Referring now to the drawings, FIG. 1 illustrates a first embodiment of an adjustable pulley according to the subject invention and which comprises a stationary flange 1 which is integrally formed with a hub socket 3, and a movable flange 2 axially reciprocably mounted on the hub socket 3.

The flange 1 including the hub socket 3, and the movable flange 2, each form a one-piece component and, preferably, are made of gray cast iron.

The movable flange 2 comprises a hub portion 5 having an inner peripheral surface 4 which is provided with a self-lubricating slidable liner made of a plastic material having a low coefficient of friction, such as Teflon (TM).

The flanges 1 and 2, in the embodiments shown, are of small diameter, i.e., with an outer diameter 7 of only 85 mm. and outer diameter of the cylindrical surface 8 of the hub socket 3, of 24 mm. and it has been experimentally found that the diametrical clearance of 0.007–0.003 which exists between the inner surface 6a of the layer 6 and the outer cylindrical surface 8, is most advantageous.

Mounted on the hub socket 3 at the free end 3a thereof, is a flange-shaped disc 9 which is retained on the hub socket 3 by means of a snap ring 11. Abutting against the flange-shaped disc 9 is one end of a spring member 12 and whose other end engages and biasses the movable flange in direction toward the stationary flange.

The movable flange 2, under bias of the spring member 12, adjusts itself in conformity with the nature of the load on the discs 1, 2 by the endless belt 10. The load usually is low and the pressure of the spring member 12 is sufficient to press the movable disc 2 into contact with the belt 10, respectively the belt into contact with the stationary disc 1 to thereby transmit the torque of the disc 1 and the hub socket 3 to the movable disc 2 practically without slippage.

To further reduce slippage between the flanges, the ends 12a, 12b of the spring member 12 can be provided with rings 27, 28 which are made of plastic and have a relatively high coefficient of friction. The provision of the rings 27, 28 increases the friction between the movable flange 2 and the stationary flange 1 and permits the transmission of a higher torque wihout occurrence of increased slippage between the two flanges.

In assembly, the spring end 12a and the plastic ring 27 are centered in a recess 29 in the front face of the movable flange 2 and spring end 12b and the plastic ring 28 are centered within the flange-shaped disc 9.

Also, the plastic rings 27, 28 may be formed such as to balance the spring member 12, which is important especially at high speeds of rotation.

FIG. 2 shows a further embodiment of the adjustable pulley according to the present invention, and in which the movable flange 2' is axially adjustable relative to the stationary flange 1' by means of axial pressure exerted on the movable disc 2' via a flange-shaped disc 14 and roller bearing members 15.

The flange-shaped disc 14 accommodates an outer race 16 of the roller bearing members 15 and an inner race 17 thereof which is mounted on a hub portion 5' of the movable flange 2' and abuts against a shoulder 18 of the hub portion 5'.

With this flange adjusting arrangement, friction for the transmission of the torque between the two flanges is less as compared with the torque transmission friction of the flange adjusting arrangement of FIG. 1, however, the friction between the belt 10' and the movable disc 2' is still sufficiently high to effectively transmit the torque to the latter without excessive slippage, taking into consideration of course that again, as in the embediment of FIG. 1, the flanges 1' and 2' are of small diameter.

A self-lubricating, slidable plastic layer 20 such as a Teflon layer, in this instance, is arranged in the bores of two axially spaced separate bushings 30, 31 such that the space 32 defined between the two bushings 30, 31 and the hub portion 5' can be suitably filled with a lubricant to further lubricate the respective surfaces.

Shown in FIGS. 3 and 4 is a third embodiment of the adjustable pulley according to the present invention, and in which a hollow shaft 19 which constitutes the hub member in this embodiment, at its one end is provided with a flange 21 which is fixedly secured to the shaft 19 by means of a set screw 22. Flange 21 thus forms the stationary flange while the shaft 19 serves either as drive or driven shaft.

The shaft 19 preferably is drawn and is peripherally provided with three symmetrically arranged and longitudinally extending elevations 23. The evenly spaced apart elevations 23 co-operate with three matching recesses 24a, 24b and 24c in the inner periphery 24d of a movable flange 24 reciprocably mounted on the shaft 19.

The clearance between the outer surface of the shaft 19 and the inner surface of the movable flange 24 is such that a self-lubricating, slidable layer 25 can be peripherally attached to the inner surface of the movable flange whereupon the movable flange is mounted on the shaft 19 with the three elevations 23 mating with the three respective recesses in the inner periphery 24d of the flange 24 such that the latter is easily slidable on the shaft 19.

Alternatively, a bushing, not shown, may be interposed between the inner surface of the movable flange 24 and the outer surface of the shaft 19 and with a layer of Teflon attached to one of the surfaces.

A spring 26 is provided between the movable flange 24, on the one hand, and a flange-shaped disc 9' on the other hand, with the latter being retained on the shaft 19 by means of a snap ring 11'.

Operation of the spring 26 is similar to that of spring 12 of the arrangement in FIG. 1.

The interior self-lubricating slidable plastic layer between the surfaces may easily be applied by providing the hub portions of the movable flanges centered on the hub sockets of the stationary flanges, with a small diameter bore extending through the hub portions and through which the plastic in liquid form is injected so as to enable the same to spread between the surfaces of the movable flanges and the hub sockets. Prior to injection of the liquid plastic, the outer surfaces of the hub sockets are to be coated with a layer which rejects the plastic material and which thus avoids binding of the same with the outer surface of the hub sockets.

Conversely, the inner surface of the movable flange may be coated with the layer which rejects the plastic material when it is desired that the outer surface of the hub socket is to be provided with the layer of self-lubricating slidable plastic material.

It is, of course, self-evident that depending on the requirements and circumstances, either of the two surfaces may be coated with the layer of plastic material having a low coefficient of friction so as to suitably overcome the hereinbefore stated structural disadvantages of the hitherto known adjustable pulleys.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a sheave, a combination comprising a shaft member having an outer peripheral surface; a first flange member coaxially fixed to said shaft member; a second flange member arranged coaxially with respect to said shaft member and axially movable away from said first flange member against a biasing force, said second flange member having an inner peripheral surface spacedly surrounding said outer peripheral surface of said shaft member; at least one bushing member mounted at said inner peripheral surface of said second flange member and having an interior surface surrounding a portion of said shaft member with clearance; and a liner of a material having a low coefficient of friction arranged in said clearance and bonded to said interior surface of said bushing member.

2. A combination as defined in claim 1, wherein said second flange member comprises a hub portion provided with a shoulder, and including a roller bearing having an outer race and an inner race mounted on said hub portion and engaging said shoulder, a third flange member axially movable on said hub portion surrounding and connected to said outer race of said roller bearing so that said second flange member may be biased toward said first flange member by an axial force applied to said third flange member.

3. In a sheave, a combination comprising a shaft member having an outer cylindrical surface; a first flange member coaxially fixed to said shaft member; a retaining member fixed to said shaft member spaced from said first flange member; a second flange member arranged coaxially with said shaft member between said first flange member and said retainer member and axially movable toward and away from said first flange member, said second flange member having an inner surface spacedly surrounding said outer cylindrical surface of said shaft member; a liner of a material having a low coefficient of friction between and in contact with both of said surfaces; a coil spring surrounding a portion of said shaft member intermediate said second flange member and said retainer member, said coil spring having opposite ends; and a pair of plastic rings of a material having a high coefficient of friction surrounding said shaft member and respectively fixed to said opposite ends of said coil spring and respectively engaging said retainer member and said second flange member.

4. A combination as defined in claim 3, wherein said shaft member is constituted by a hub portion of said first flange member, said hub portion being integral with said first flange member.

5. A combination as defined in claim 1, wherein said second flange member comprises a plurality of said bushing members axially spaced relative to each other along said shaft member and each provided with said liner of said material having a low coefficient of friction.

6. A combination as defined in claim 1, wherein said material having a low coefficient of friction is a plastic material.

7. A combination as defined in claim 6, wherein said plastic material consists essentially of polytetrafluoroethylene.

8. A combination as defined in claim 1, wherein said first stationary flange member is unitary with said shaft member, and wherein said shaft member constitutes a hub portion of said first flange member.

9. A combination as defined in claim 8, wherein said first stationary flange member unitary with said shaft member and said second flange member are one-piece constructions and are made of gray cast iron.

10. A combination as defined in claim 1, wherein said biasing force is constituted by a spring member abuttingly engaging and biasing said second flange member in direction towards said first flange member.

11. A combination as defined in claim 10, wherein said spring member coaxially surrounds a portion of said shaft member intermediate said second flange member and a retainer member, said first flange member being located towards one end of said shaft member and said retainer member being located towards the other end of said shaft member.

12. A combination as defined in claim 11, wherein said retainer member constitutes a third flange member, and wherein one end of said spring member engages said third flange member and the other end of said spring member is retained in a recess formed in said second flange member.

13. A combination as defined in claim 12, wherein said one and said other end of said spring member each are provided with a plastic ring respectively engaging said third flange member and in said recess, said plastic rings having a substantially high friction coefficient.

References Cited

UNITED STATES PATENTS

| | | | |
|---|---|---|---|
| 2,937,042 | 5/1960 | Wilder, Jr. | 74—230.17 C |
| 3,174,348 | 3/1965 | Luenberger | 74—230.17 C |
| 3,138,032 | 6/1964 | Raso et al. | 74—230.17 C |
| 3,250,553 | 5/1966 | Detwiler | 74—230.17 C |
| 3,383,934 | 5/1968 | Flynn | 74—230.17 C |
| 3,444,749 | 5/1969 | Ruprecht et al. | 74—230.17 C |

CORNELIUS J. HUSAR, Primary Examiner